United States Patent
Yamamoto et al.

(10) Patent No.: US 11,656,806 B2
(45) Date of Patent: May 23, 2023

(54) INFORMATION PROCESSING APPARATUS AND SYSTEM AND NON-TRANSITORY COMPUTER READABLE MEDIUM

(71) Applicant: FUJIFILM Business Innovation Corp., Tokyo (JP)

(72) Inventors: Takuma Yamamoto, Kanagawa (JP); Kohei Kaibara, Kanagawa (JP); Toru Takahashi, Kanagawa (JP); Masakazu Ketsuka, Kanagawa (JP); Mitsuru Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/553,977

(22) Filed: Dec. 17, 2021

(65) Prior Publication Data
US 2023/0058537 A1    Feb. 23, 2023

(30) Foreign Application Priority Data
Aug. 17, 2021    (JP) .............................. JP2021-132568

(51) Int. Cl.
*G06F 3/12*    (2006.01)
*H04L 51/216*    (2022.01)

(52) U.S. Cl.
CPC .......... *G06F 3/1204* (2013.01); *G06F 3/1254* (2013.01); *H04L 51/216* (2022.05); *G06F 3/1287* (2013.01)

(58) Field of Classification Search
None
See application file for complete search history.

(56) References Cited

U.S. PATENT DOCUMENTS

| 10,530,718 | B2 * | 1/2020 | Denoue ................. G06F 40/166 |
| 10,897,439 | B2 | 1/2021 | Denoue et al. |
| 2019/0042291 | A1 * | 2/2019 | Kogure ................. G06F 9/4881 |
| 2021/0211549 | A1 * | 7/2021 | Takashima .......... H04N 1/00424 |

FOREIGN PATENT DOCUMENTS

| JP | 2019-028983 A | 2/2019 |
| JP | 2020-047000 A | 3/2020 |

* cited by examiner

*Primary Examiner* — Frantz Bataille
(74) *Attorney, Agent, or Firm* — Sughrue Mion, PLLC

(57) ABSTRACT

An information processing apparatus includes a processor configured to: generate an identification image in response to at least one of a thread and a digital document posted on the thread being specified, the thread being displayed on a service screen of a message exchange service, the identification image being linked with information for accessing the thread; and perform control to output the generated identification image in a readable format.

14 Claims, 15 Drawing Sheets

INFORMATION PROCESSING APPARATUS AND SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-132568 filed Aug. 17, 2021.

BACKGROUND

(i) Technical Field

The present disclosure relates to an information processing apparatus and system and a non-transitory computer readable medium.

(ii) Related Art

In a site where users can exchange information by using a message exchange service, such as a chat service in which team members can participate, a system that enables a member to post a digital document on a thread of the chat service is available (see Japanese Unexamined Patent Application Publication No. 2019-28983, for example). A member using such a system may download and store a digital document posted on a thread or print out a thread or a digital document posted on the thread.

SUMMARY

Once a digital document is downloaded from a thread used in a chat service, or a document is printed out as a paper medium from this digital document, or a document is printed out as a paper medium from the thread, such a downloaded or printed document is no longer related to the thread. It is thus difficult to identify the thread from the downloaded digital document or the printed document.

Aspects of non-limiting embodiments of the present disclosure relate to making it possible to identify and access a thread in an information exchange site using a message exchange service, such as a group chat service, from a digital document downloaded from this thread, a document printed out from this digital document, and a document printed out from the thread.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: generate an identification image in response to at least one of a thread and a digital document posted on the thread being specified, the thread being displayed on a service screen of a message exchange service, the identification image being linked with information for accessing the thread; and perform control to output the generated identification image in a readable format.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will be described below in detail with reference to the accompanying drawings.

(Configuration of Information Processing System)

Figure 1:
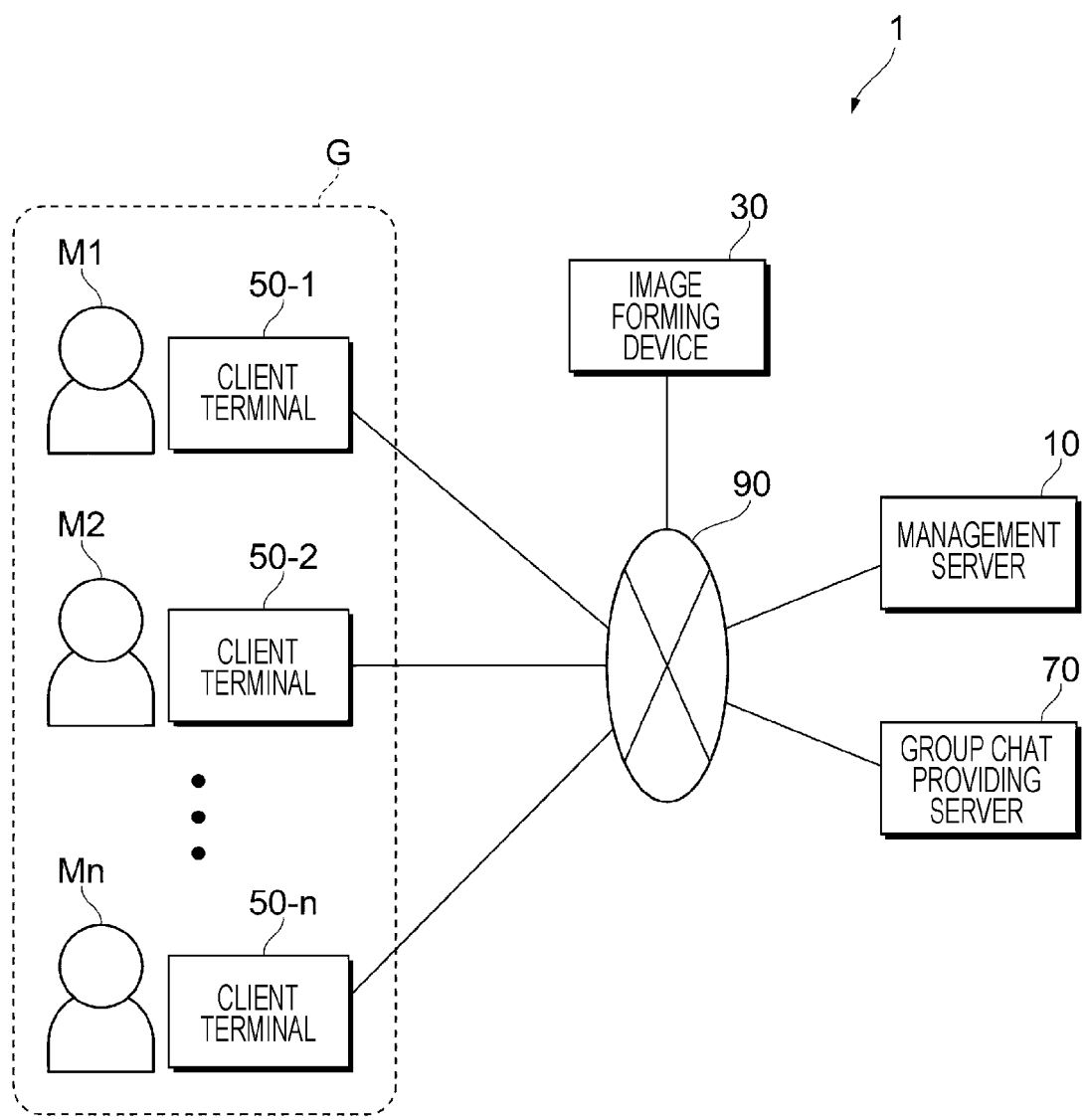
FIG. 1 is a schematic diagram illustrating the overall configuration of an information processing system to which the exemplary embodiment is applied.

FIG. 1 is a schematic diagram illustrating the overall configuration of an information processing system 1 to which the exemplary embodiment is applied.

The information processing system 1 includes a management server 10, an image forming device 30, client terminals 50-1 through 50-n (n is an integer of two or greater), and a group chat providing server 70. These elements are connected to each other via a network 90. In FIG. 1, only one image forming device 30 and only one group chat providing server 70 are shown. However, plural image forming devices 30 and plural group chat providing servers 70 may be connected to the network 90. The network 90 is a local area network (LAN) or the internet, for example.

The management server 10 is an information processing apparatus which serves as a server that manages the entirety of the information processing system 1. The management server 10 performs control so that an identification image linked with information for accessing a thread forming a service screen of a message exchange service is generated and is output in a readable format. In the exemplary embodiment, the message exchange service is a group chat service, and the identification image is a two-dimensional code, such as a Quick Response (QR) code (registered trademark). Outputting an identification image in a readable format refers to that image data in the form of a two-dimensional code, such as a QR code, is sent by email, for example, or is displayed on a screen, or is formed on a recording medium, for example.

The image forming device 30 is an information processing apparatus that forms an image on a recording medium, based on image data. The image forming device 30 displays information concerning a thread of a message exchange service on a screen and receives an input operation. The image forming device 30 also forms an identification image on a print surface of a recording medium such as a sheet. On the print surface of a sheet, in addition to the identification image, the content of a digital document posted on a thread and the content of the thread are formed. In the exemplary embodiment, a digital document represents the content of a digital medium. Examples of the digital document are a document file and an image file (still images and video images) stored in each of the client terminals 50-1 through 50-$n$ and a document file and an image file generated as a result of the image forming device 30 reading a document recorded on the print surface of a sheet. As the image forming device 30, an electrophotographic system type which forms a toner image on the print surface of a sheet or an inkjet system type which ejects ink onto the print surface of a sheet, may be used.

The client terminals 50-1 through 50-$n$ are information processing apparatuses, such as smartphones, personal computers, and tablet terminals, and are respectively used by members M1 through Mn belonging to the same group G. The client terminals 50-1 through 50-$n$ each display a group chat screen to be used by the members M1 through Mn. Hereinafter, the client terminals 50-1 through 50-$n$ will be collectively called the client terminals 50 and the members M1 through Mn will be collectively called the members M unless it is necessary to distinguish them from each other. In FIG. 1, only one group G constituted by the members M1 through Mn is shown. However, multiple groups G may be included in the information processing system 1, in which case, one member M may belong to more than one group G.

The group chat providing server 70 is an information processing apparatus which serves as a server that provides a group chat service to the members M. The administrator managing the group chat providing server 70 and that managing the management server 10 may be the same administrator or may be different administrators.

(Hardware Configuration of Management Server)

Figure 2:
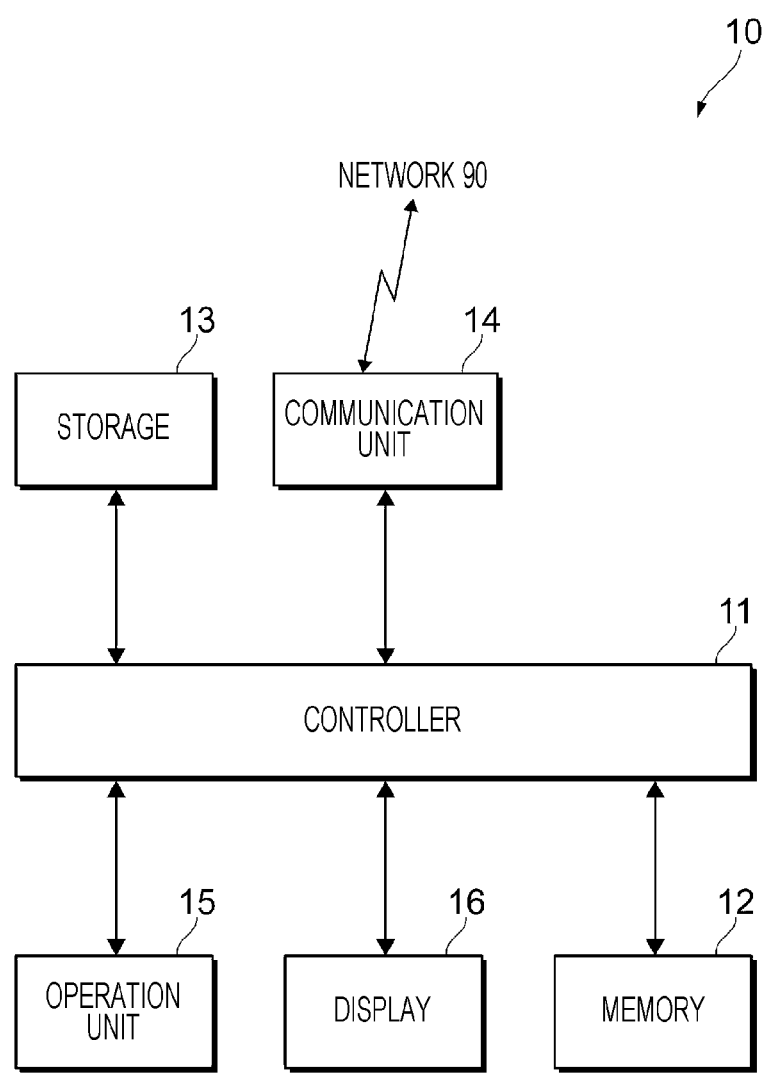
FIG. 2 is a block diagram illustrating the hardware configuration of a management server.

FIG. 2 is a block diagram illustrating the hardware configuration of the management server 10.

The management server 10 includes a controller 11, a memory 12, a storage 13, a communication unit 14, an operation unit 15, and a display 16. These elements are connected to each other via a data bus, an address bus, and a peripheral component interconnect (PCI) bus, for example.

The controller 11 is a processor that controls the operation of the management server 10 by executing various software programs, such as an operating system (OS) (basic software) and application software. The controller 11 is constituted by a central processing unit (CPU), for example. The memory 12 is a storage region for storing various software programs and data used for the execution of the software programs, and is used as a work area by the controller 11 to execute processing. The memory 12 is constituted by a random access memory (RAM), for example.

The storage 13 is a storage region for storing data to be input into various software programs and data output therefrom. The storage 13 is constituted by a hard disk drive (HDD), a solid state drive (SSD), or a semiconductor memory, for example, used for storing programs and various items of setting data. The communication unit 14 sends and receives data via the network 90. The communication unit 14 sends and receives data with the client terminals 50 and the group chat providing server 70.

The operation unit 15 is constituted by a keyboard, a mouse, a mechanical button, and a switch, for example, and receives input operation. The operation unit 15 also includes a touch sensor, which integrally forms a touchscreen with the display 16. The display 16 displays image and text information, for example. The display 16 is constituted by a liquid crystal display or an organic electroluminescence (EL) display used for displaying information, for example.

(Hardware Configuration of Image Forming Device)

Figure 3:
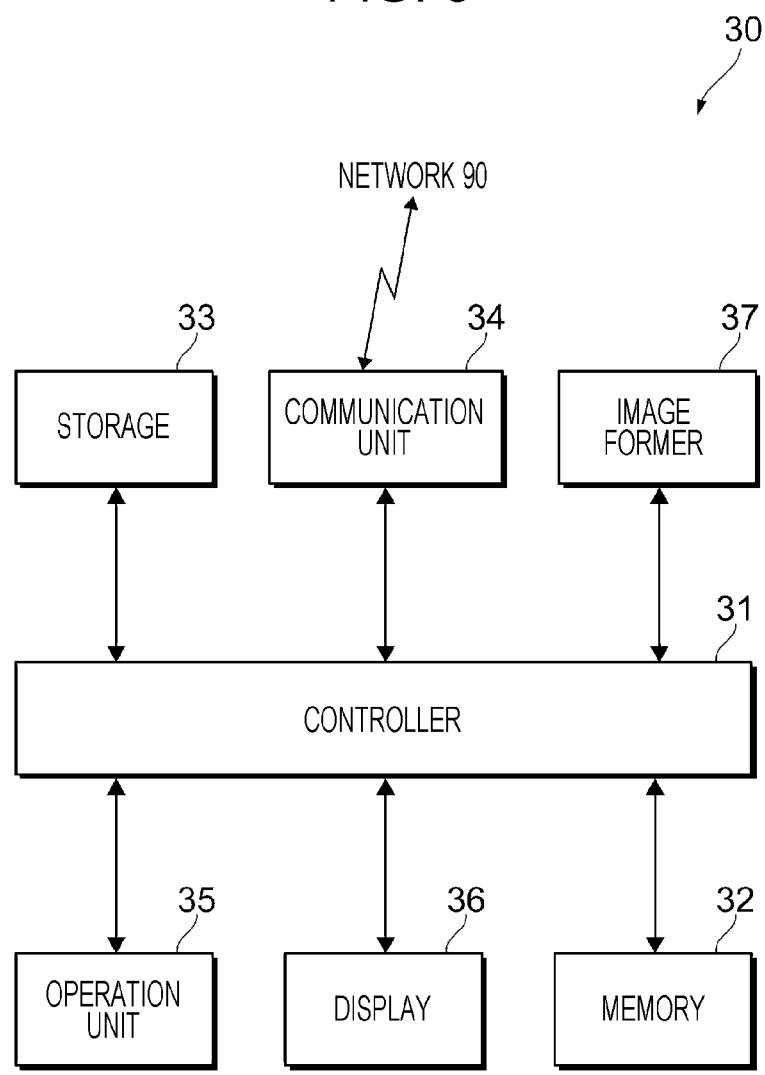
FIG. 3 is a block diagram illustrating the hardware configuration of an image forming device.

FIG. 3 is a block diagram illustrating the hardware configuration of the image forming device 30.

The hardware configuration of the image forming device 30 is similar to that of the management server 10 shown in FIG. 2, except for the provision of an image former 37. That is, the image forming device 30 includes a controller 31 constituted by a processor, such as a CPU, a memory 32 constituted by a storage region, such as a RAM, and a storage 33 constituted by a storage region, such as an HDD, an SSD, or a semiconductor memory. The image forming device 30 also includes a communication unit 34 that sends and receives data with external devices, such as the management server 10 and the client terminals 50, via the network 90. The image forming device 30 also includes an operation unit 35 constituted by a keyboard, a mouse, and a touchscreen, for example, and a display 36 constituted by a liquid crystal display or an organic EL display. These elements of the image forming device 30 are connected to each other via a data bus, an address bus, and a PCI bus, for example.

The image former 37 forms an image based on image data on a print surface of a recording medium, such as a sheet, by using the electrophotographic system or the inkjet system. In the exemplary embodiment, examples of the image data are data on an identification image, data on a digital document posted on a thread, data on a thread, and print data reconstructed from a displayed element, such as a displayed thread or message.

(Hardware Configurations of Client Terminals and Group Chat Providing Server)

The hardware configurations of the client terminals 50 and the group chat providing server 70 are similar to that of the management server 10 shown in FIG. 2, and an explanation and illustration thereof is thus omitted.

(Functional Configuration of Controller of Management Server)

Figure 4:
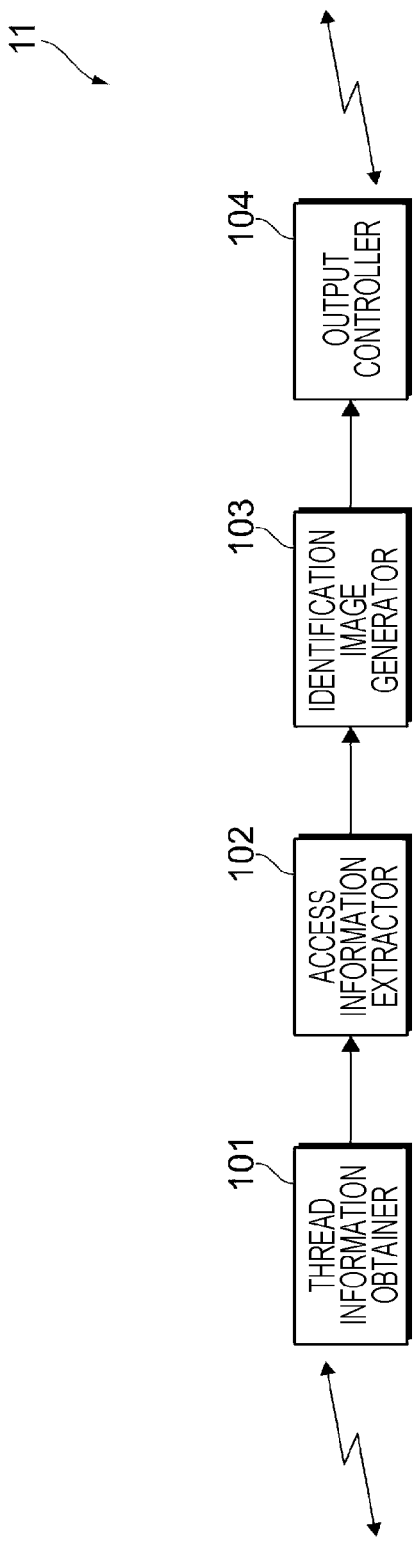
FIG. 4 is a block diagram illustrating the functional configuration of a controller of the management server.

FIG. 4 is a block diagram illustrating the functional configuration of the controller 11 of the management server 10.

The controller 11 of the management server 10 includes as functions a thread information obtainer 101, an access information extractor 102, an identification image generator 103, and an output controller 104.

The thread information obtainer 101 obtains, as thread information, information concerning threads in a group chat sent from the group chat providing server 70. The thread information obtained by the thread information obtainer 101 includes access information for accessing a thread or text of a message posted on a thread and information concerning a message posted on a thread, for example. In the exemplary embodiment, the access information is a uniform resource locator (URL) of a thread or text of a message. The information concerning a message posted on a thread indicates the time and the date at and on which the message is posted, the temporal information of the message text, the content of the message, and a digital document attached to the message, for example.

The thread information obtained by the thread information obtainer 101 includes information for identifying each of a thread, a message, and a digital document specified as an object to be output by performing a predetermined input operation. The predetermined input operation is an input operation for specifying an individual thread or text of an individual message displayed on a group chat screen or specifying an individual digital document posted on a thread. The digital document posted on a thread is a digital document attached to a message posted on the thread.

The thread information sent from the group chat providing server 70 may be thread information concerning a thread specified as an object to be output and thread information concerning a thread on which a digital document specified as an object to be output is posted. The thread information sent from the group chat providing server 70 may be all items of thread information including thread information concerning a thread or a digital document which is not specified as an object to be output. A user may specify the time and date and receive thread information concerning threads including messages posted on the specified time and date onwards.

Examples of the predetermined input operation are pressing a "Like" button or performing a reply operation, for example. If an object to be output is specified by pressing a "Like" button, a "Like" button provided for an individual thread or an individual message is used. When a "Like" button provided for an individual thread is pressed, this thread is specified as an object to be output. When a "Like" button provided for an individual message is pressed, a digital document attached to this message is specified as an object to be output. Specific examples of a "Like" button provided for an individual thread or text of an individual message will be discussed later in detail with reference to FIGS. 8, 10, and 11.

If an object to be output is specified by performing a reply operation, a reply is sent in response to a message having an attached digital document to be output. In this case, if a reply is sent by inputting an output condition, such as the number of print copies, into the body of the message, the attached document is printed under this output condition. A specific example in which an object to be output is specified with an output condition by a reply operation will be discussed later in detail with reference to FIG. 9.

The access information extractor 102 extracts access information from thread information obtained by the thread information obtainer 101, and more specifically, from each of thread information concerning a thread or a message specified as an object to be output and thread information concerning a thread on which a digital document specified as an object to be output is posted. In the exemplary embodiment, the access information extractor 102 extracts the URL of a specified thread and/or message text and the URL of a thread on which a specified digital document is posted.

The identification image generator 103 generates an identification image linked with the access information extracted by the access information extractor 102. In the exemplary embodiment, a two-dimensional code is generated as the identification image linked with the URL of a specified thread and/or text of a message, and also, a two-dimensional code is generated as the identification image linked with the URL of a thread on which a specified digital document is posted.

The output controller 104 performs control so that an identification image generated by the identification image generator 103 can be output in a readable format. For example, the output controller 104 performs control to send image data of a two-dimensional code as the identification image generated by the identification image generator 103 to the image forming device 30 and to cause the image forming device 30 to form the two-dimensional code on a print surface of a recording medium, such as a sheet. More specifically, when image data of an image indicating the content of a specified thread is sent to the image forming device 30 and the image forming device 30 prints the image on a sheet, a two-dimensional code linked with the URL of this thread is formed on part of this sheet, such as a blank space of the sheet. When image data of an image indicating the content of a specified digital document is sent to the image forming device 30 and the image forming device 30 prints the image on a sheet, a two-dimensional code linked with the URL of a thread on which the specified digital document is posted is formed on part of this sheet, such as a blank space of the sheet.

The output controller 104 performs control to send image data of a two-dimensional code generated as an identification image by the identification image generator 103 to a client terminal 50 and to cause the client terminal 50 to display the two-dimensional code on a display of the client terminal 50. More specifically, the output controller 104 performs control so that image data of a two-dimensional code generated as an identification image is sent to a client terminal 50, which serves as a different information processing apparatus, and is output from the client terminal 50 in a readable format. In this case, for example, when an image indicating the content of a specified thread is displayed on the display of the client terminal 50, a two-dimensional code linked with the URL of this thread is displayed on part of the image.

(Functional Configuration of Image Forming Device)

Figure 5:
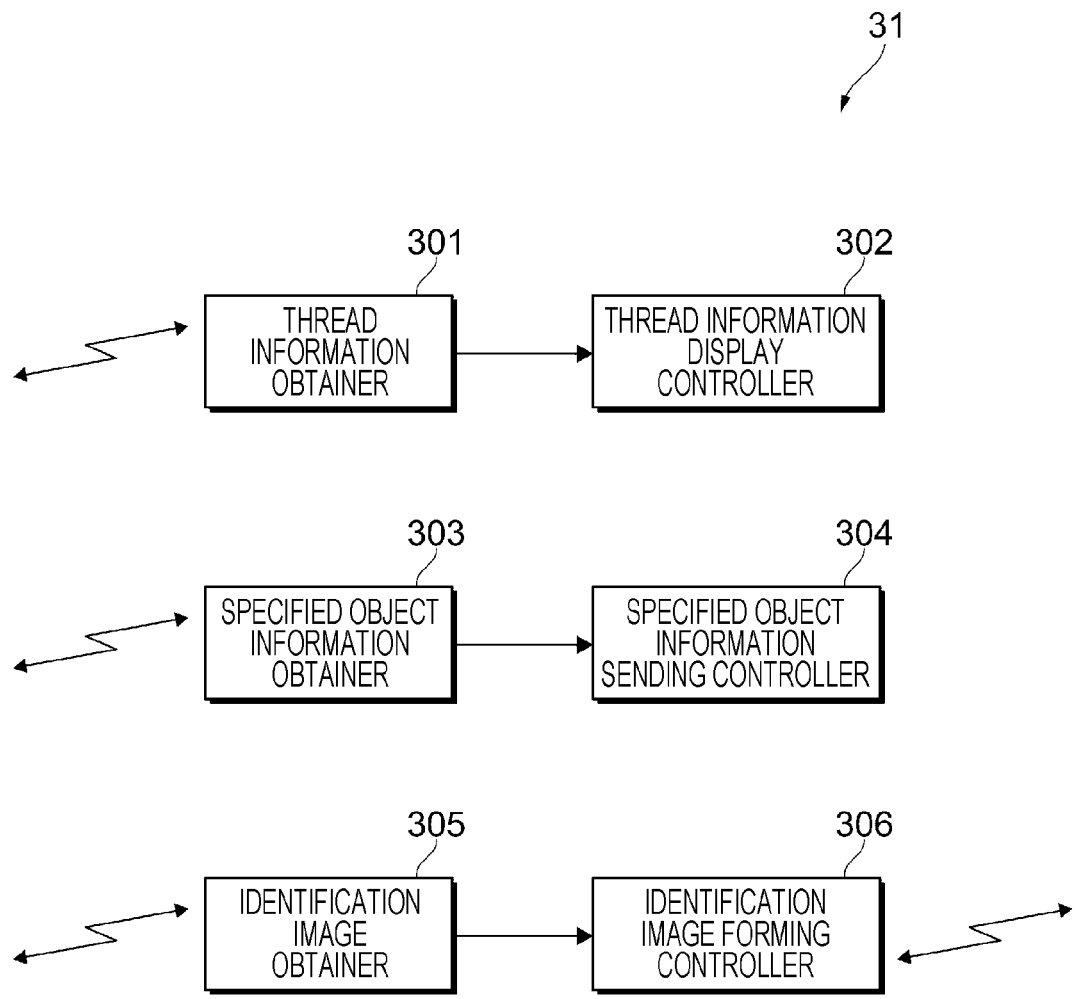
FIG. 5 is a block diagram illustrating the functional configuration of a controller of the image forming device.

FIG. 5 is a block diagram illustrating the functional configuration of the controller 31 of the image forming device 30.

The controller 31 of the image forming device 30 includes as functions a thread information obtainer 301, a thread information display controller 302, a specified object information obtainer 303, a specified object information sending controller 304, an identification image obtainer 305, and an identification image forming controller 306.

The thread information obtainer 301 obtains, as thread information, information concerning threads in a group chat sent from the group chat providing server 70. The thread information obtained by the thread information obtainer 301 includes information concerning a message posted on a thread. As stated above, the information concerning a message posted on a thread indicates the content of the message and a digital document attached to the message, for example.

The thread information obtained by the thread information obtainer 301 includes information for identifying each of a thread and a digital document specified by performing the above-described predetermined input operation. As the thread information sent to the image forming device 30, thread information concerning a specified thread, that of a specified message, and that of a specified digital document may be sent, or all items of thread information including thread information concerning a thread or a digital document which is not specified as an object to be output may be sent.

The thread information display controller 302 performs control to display the thread information obtained by the thread information obtainer 301 on the display 36. For example, the thread information display controller 302 performs control so that information for identifying a thread, that for a message posted on a thread, and that for a digital document attached to a message posted on a thread are displayed on the display 36 in a selectable format. Specific examples of screens on which these items of information included in the thread information are displayed in a selectable format will be discussed later with reference to FIGS. 12 through 13B.

When an input operation is performed on the operation unit 35 to specify a thread or a digital document as an object to be output, the specified object information obtainer 303 obtains information about the input operation as specified object information. More specifically, the specified object information obtainer 303 obtains, as specified object information, information for identifying a specified thread and/or message text and information for identifying a specified digital document.

The specified object information sending controller 304 performs control to send the specified object information obtained by the specified object information obtainer 303 to the management server 10. More specifically, the specified object information sending controller 304 performs control to send, as the specified object information, information for identifying a specified thread and/or message text and that for identifying a specified digital document to the management server 10.

The identification image obtainer 305 obtains image data of a two-dimensional code as an identification image generated in and sent from the management server 10. For example, the identification image obtainer 305 obtains image data of a two-dimensional code linked with the URL of a specified thread and/or message text. The identification image obtainer 305 also obtains image data of a two-dimensional code linked with the URL of a thread on which a specified digital document is posted.

Based on the image data of a two-dimensional code as the identification image obtained by the identification image obtainer 305, the identification image forming controller 306 performs control to form the two-dimensional code on the print surface of a recording medium, such as a sheet. Processing for forming the two-dimensional code on the print surface of a sheet is performed by the image former 37. Specific examples of a sheet on which a two-dimensional code is formed as the identification image will be discussed later with reference to FIGS. 14 and 15.

(Processing of Management Server)

Figure 6:
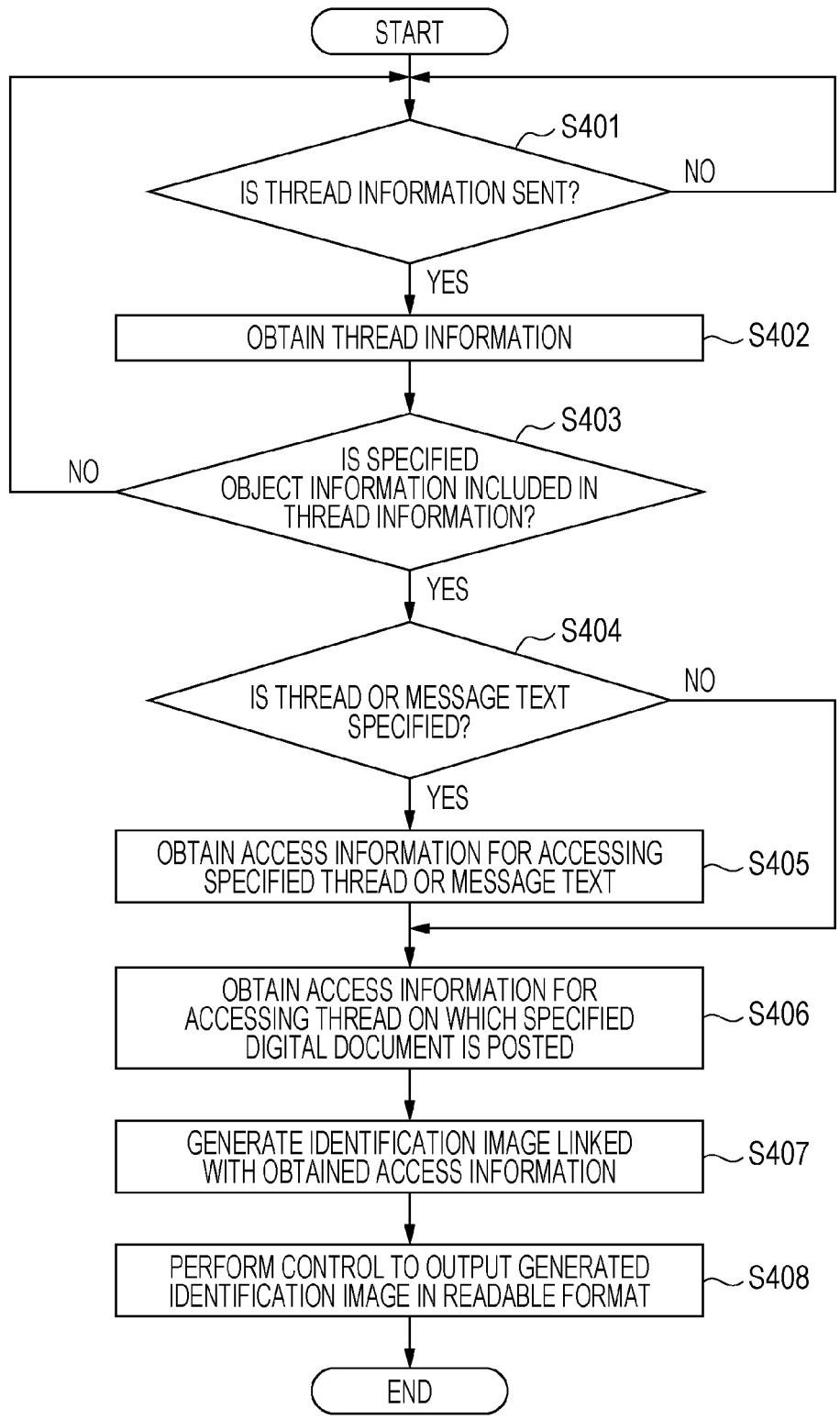
FIG. 6 is a flowchart illustrating processing executed by the management server.

FIG. 6 is a flowchart illustrating processing executed by the management server 10.

If thread information is sent from the group chat providing server 70 as information concerning threads of a group chat (YES in step S401), the management server 10 obtains the thread information in step S402. If no thread information is sent from the group chat providing server 70 (NO in step S401), the management server 10 repeats step S401 until thread information is sent from the group chat providing server 70.

If specified object information is included in the obtained thread information (YES in step S403) and if a thread or text of a message is specified as an object to be output (YES in step S404), the management server 10 obtains access information for accessing the specified thread or message text in step S405. More specifically, the management server 10 obtains the URL of the specified thread or message text. If specified object information is included in the obtained thread information (YES in step S403) and if a thread or text of a message is not specified, but a digital document is specified as an object to be output (NO in step S404), in step S406, the management server 10 obtains access information for accessing a thread on which the specified digital document is posted. More specifically, the management server 10 obtains the URL of a thread on which the specified digital document is posted. If specified object information is not included in the obtained thread information (NO in step S403), the management server 10 returns to step S401.

After obtaining the access information, the management server 10 generates an identification image linked with the obtained access information in step S407. More specifically, the management server 10 generates image data of a two-dimensional code as the identification image linked with the URL of the specified thread or message text and/or the URL of a thread on which the specified digital document is posted.

After generating the identification image, in step S408, the management server 10 performs control to output the generated identification image in a readable format. More specifically, the management server 10 performs control to send image data of a two-dimensional code as the generated identification image to the image forming device 30 and to cause the image forming device 30 to form the two-dimensional code on a print surface of a recording medium, such as a sheet. The management server 10 performs control so that image data of a two-dimensional code generated as the identification image is sent to a client terminal 50, which serves as a different information processing apparatus, and is output from the client terminal 50 in a readable format. The management server 10 then completes the processing.

(Processing of Image Forming Device 30)

Figure 7:
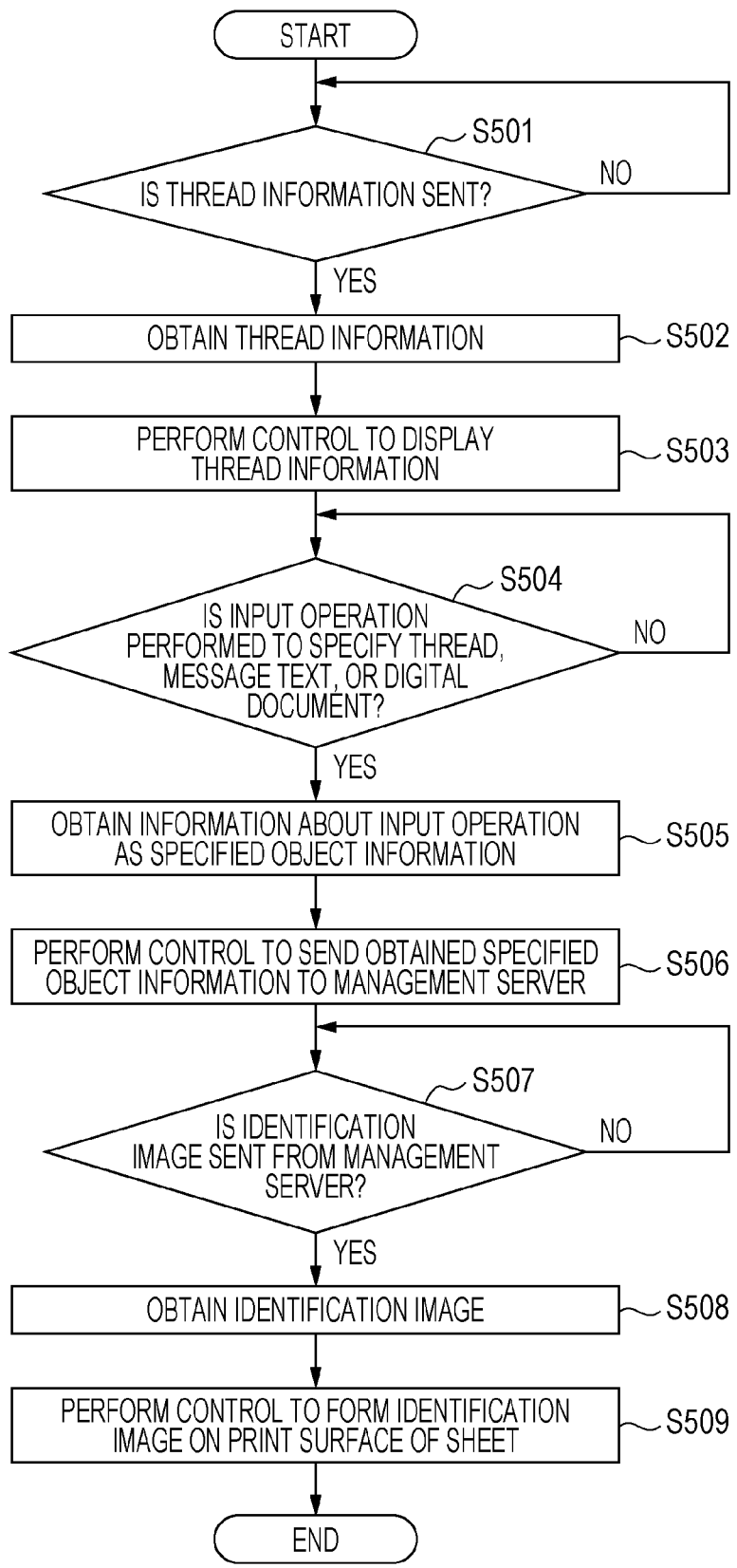
FIG. 7 is a flowchart illustrating processing executed by the image forming device.

FIG. 7 is a flowchart illustrating processing executed by the image forming device 30.

If thread information is sent from the group chat providing server 70 as information concerning threads of a group chat (YES in step S501), the image forming device 30 obtains the thread information in step S502 and performs control to display it on the display 36 in step S503. If no thread information is sent from the group chat providing server 70 (NO in step S501), the image forming device 30 repeats step S501 until thread information is sent from the group chat providing server 70.

If an input operation is performed on the operation unit 35 to specify a thread or text of a message and/or to specify a digital document (YES in step S504), the image forming device 30 obtains information about the input operation as specified object information in step S505. More specifically, the image forming device 30 obtains, as specified object information, information for identifying a specified thread or message text and/or information for identifying a specified digital document. If the above-described input operation is not performed (NO in step S504), the image forming device 30 repeats step S504 until such an input operation is performed.

In step S506, the image forming device 30 performs control to send the obtained specified object information to the management server 10. More specifically, the image forming device 30 preforms control so that information for identifying a specified thread or message text and/or information for identifying a specified digital document are sent to the management server 10 as the specified object information.

If an identification image is sent from the management server 10 (YES in step S507), the image forming device 30 obtains the identification image in step S508. Then, in step S509, based on image data indicating the obtained identification image, the image forming device 30 performs control to form the identification image on a print surface of a recording medium, such as a sheet. More specifically, the image forming device 30 obtains image data of a two-dimensional code as the identification image and performs control to form the two-dimensional code on the print surface of a recording medium, such as a sheet, based on the image data. Processing for forming the two-dimensional code on the print surface of a sheet is performed by the image former 37. The image forming device 30 then completes the processing in FIG. 7. If an identification image is not sent from the management server 10 (NO in step S507), the image forming device 30 repeats step S507 until an identification image is sent from the management server 10.

SPECIFIC EXAMPLES

Figure 8:
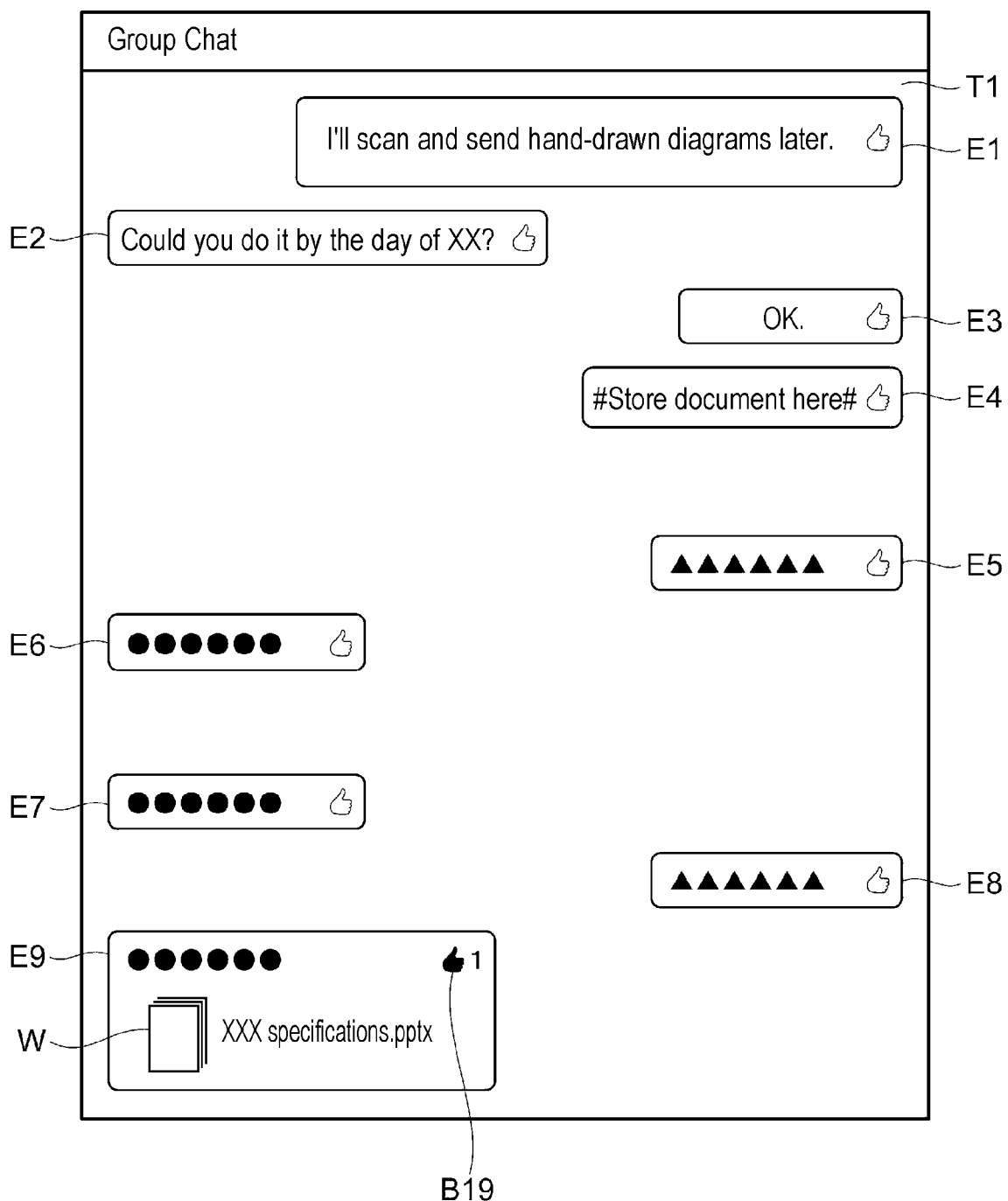
FIG. 8 illustrates a specific example in which a "Like" button is used to perform an operation for specifying a digital document as an object to be output, on a group chat screen displayed on a display of a client terminal.

FIG. 8 illustrates a specific example in which a "Like" button is used to perform an operation for specifying a digital document as an object to be output, on a group chat screen displayed on the display of a client terminal 50.

The group chat screen displayed on the display of the client terminal 50 is constituted by one or plural threads T1 through Tp (p is an integer of one or greater). Each thread T includes one or plural messages E1 through Em (m is an integer of one or greater). The thread T1 is shown in FIG. 8 as an example of the thread T. In the thread T1, messages E1 through E9 are posted in this order.

Among the messages E1 through E9 shown in FIG. 8, a digital document W having a file name "XXX specifications.pptx" is attached to the message E9. It is assumed that the message E9 is posted by the member M1 and that the member M2 wishes to print out the digital document W attached to the message E9. In this case, the member M2 can specify the digital document W as an object to be output (printed, for example) by pressing a button B19 disposed in the message E9.

The button B19 is a "Like" button typically used in message exchange services and video distribution services, for example. The originally intended use of the button B19 is that the member M2 presses the button B19 when it likes, supports, or agrees with the content of the message E9 or the digital document W. In the exemplary embodiment, however, in addition to or instead of the originally intended use of a "Like" button, a "Like" button is used to specify an object to be output. This makes it possible to identify a digital document specified as an object to be output, based on information indicating whether a "Like" button is pressed. This also eliminates the need to alter a program, such as adding a button specially used for specifying an object to be output, for example. It is thus possible to construct a highly versatile system adaptable to existing message exchange services provided by various companies.

The number "1" is indicated near the button B19. Originally, this number means the number of times a "Like" button is pressed or the number of members M having pressed the "Like" button. In the exemplary embodiment, however, in addition to or instead of the original meaning of the number indicated near a "Like" button, this number indicates the number of members M having performed the operation for specifying a certain object to be output. For example, as shown in FIG. 8, the number of members M having performed the operation for specifying the digital document W is found to be one from the number "1" indicated near the button B19.

Figure 9:
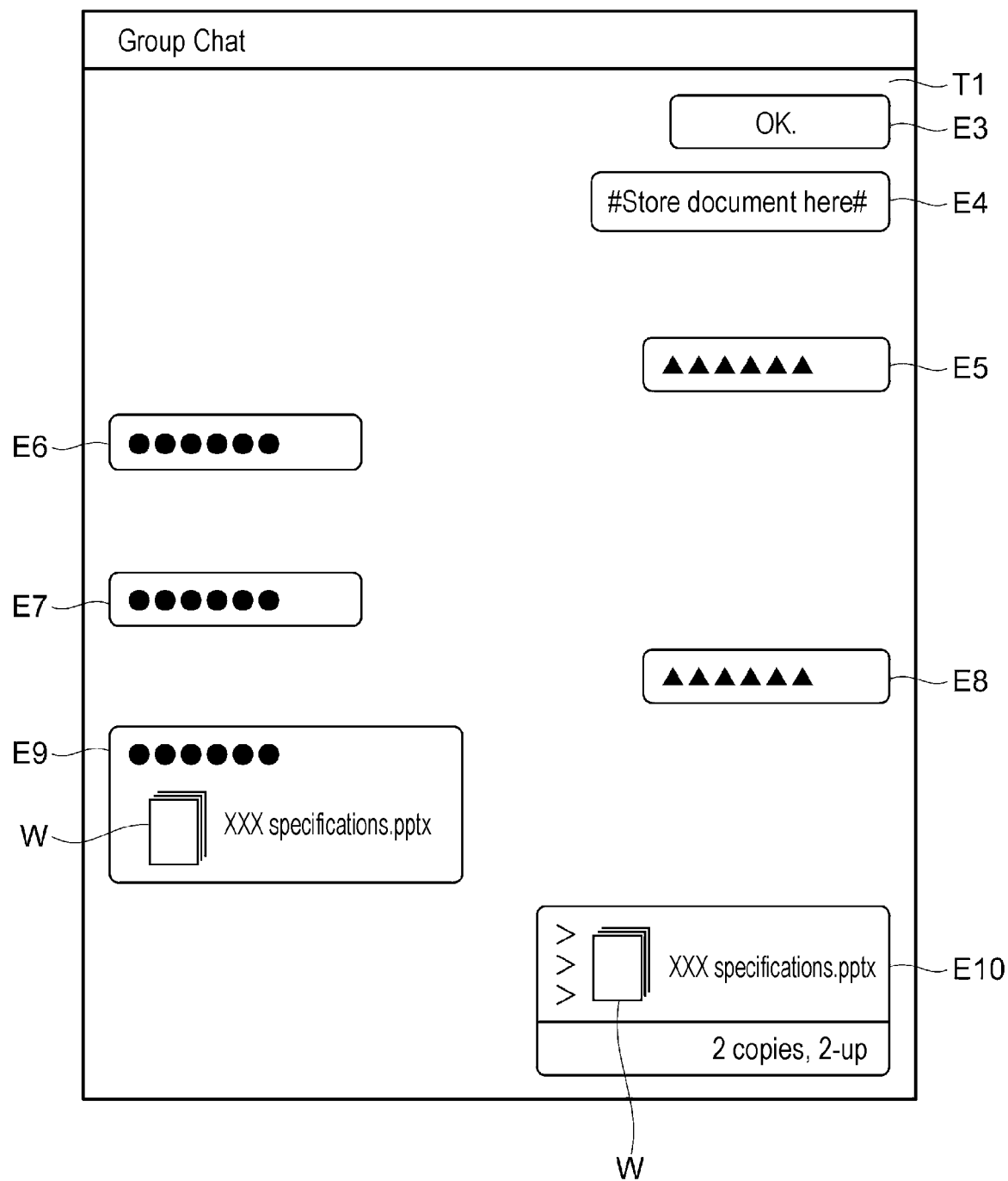
FIG. 9 illustrates a specific example in which a reply to a message is used to perform an operation for specifying a digital document as an object to be output, on a group chat screen displayed on a display of a client terminal.

FIG. 9 illustrates a specific example in which a reply to a message is used to perform an operation for specifying a digital document as an object to be output, on a group chat screen displayed on the display of a client terminal 50.

In FIG. 9, a thread T1 is indicated as an example of the group chat screen. In the thread T1, messages E3 through E10 are posted in this order.

Among the messages E3 through E10 shown in FIG. 9, a digital document W having a file name "XXX specifications.pptx" is attached to the message E9. It is assumed that the message E9 is posted by the member M1 and that the member M2 wishes to print out the digital document W attached to the message E9. In this case, the member M2 can specify the digital document W as an object to be output (printed, for example) by posting the message E10 as a reply to the message E9.

When posting the message E10, the member M2 specifies an output condition by inputting text indicating the output condition to the body of the message. Then, the image forming device 30 prints out the digital document W with this output condition. In FIG. 9, as an example of the output condition, text "2 copies, 2-up" is input into the body of the message E10. "2 copies" is an instruction to print out two copies of the digital document W attached to the message E9, while "2-up" is an instruction to print two pages of the document W on one sheet.

Figure 10:
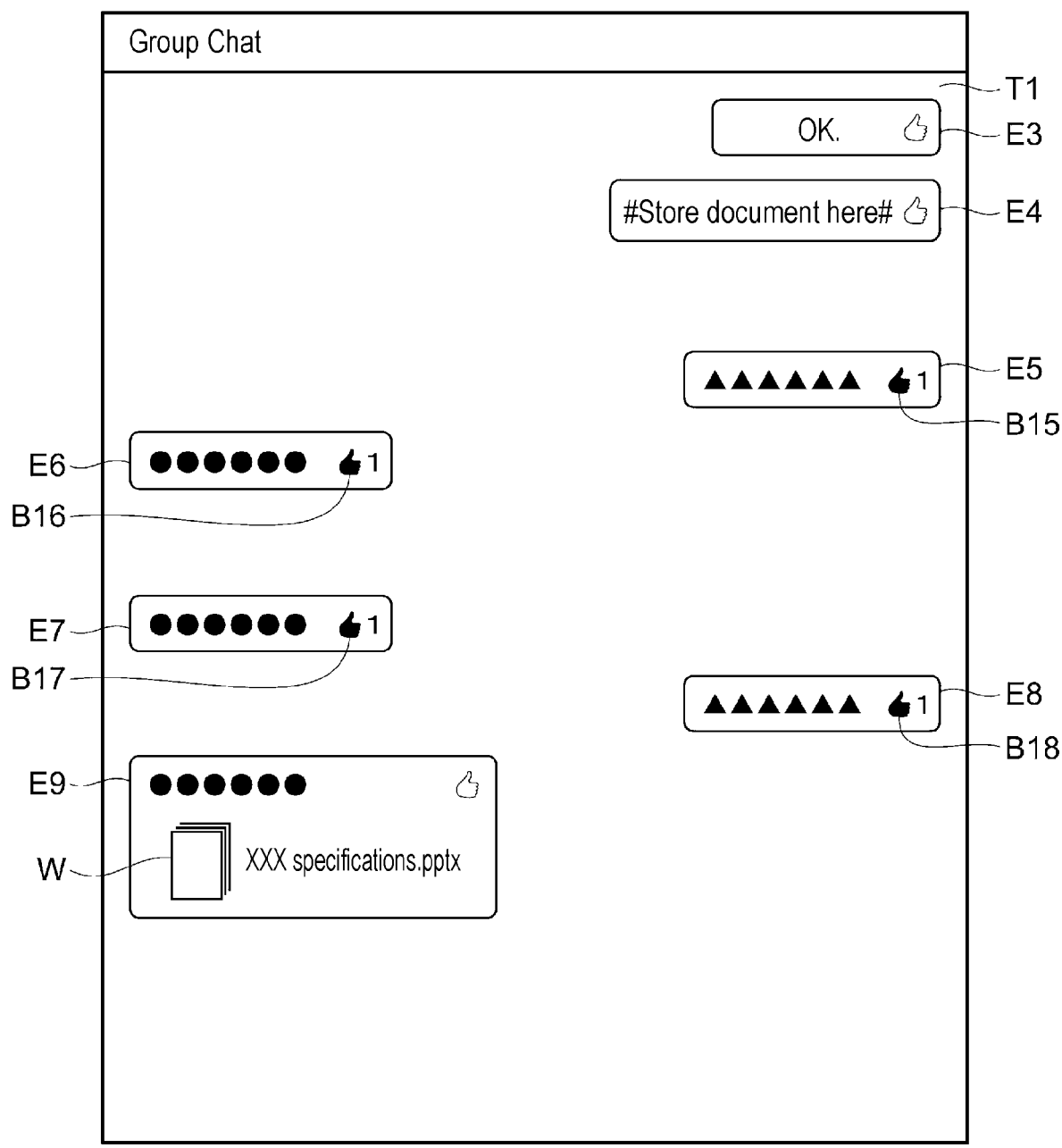
FIG. 10 illustrates a specific example in which a "Like" button is used to perform an operation for specifying the body of a message as an object to be output, on a group chat screen displayed on a display of a client terminal.

FIG. 10 illustrates a specific example in which a "Like" button is used to perform an operation for specifying the body of a message as an object to be output, on a group chat screen displayed on the display of a client terminal 50.

In FIG. 10, the thread T1 is indicated as an example of the group chat screen. In the thread T1, messages E3 through E9 are posted in this order.

Among the messages E3 through E9 shown in FIG. 10, a digital document W having a file name "XXX specifications.pptx" is attached to the message E9, while no file is attached to the other messages E3 through E8. It is assumed that the messages E3, E4, E5, and E8 are posted by the member M1, while the messages E6, E7, and E9 are posted by the member M2 and that the member M3 wishes to print out the messages exchanged between the members M1 and M2.

In this case, the member M3 can specify text of each message as an object to be output by pressing a "Like" button provided for the text of the message. More specifically, the member M3 can specify the body of each of the messages E5 through E8 as an object to be output (printed, for example) by pressing buttons B15 through B18, which are "Like" buttons, respectively provided for the messages E5 through E8.

The number "1" is indicated adjacent to each of the buttons B15 through B18. As in the above-described button B19, in addition to or instead of the original meaning of the number indicated near a "Like" button, this number indicates the number of members M having performed the operation for specifying a certain object to be output. For example, as shown in FIG. 10, the number of members M having performed the operation for specifying the message E5 and those for the messages E6 through E8 as an object to be output are found to be one from the number "1" indicated adjacent to each of the buttons B15 through B18.

Figure 11:
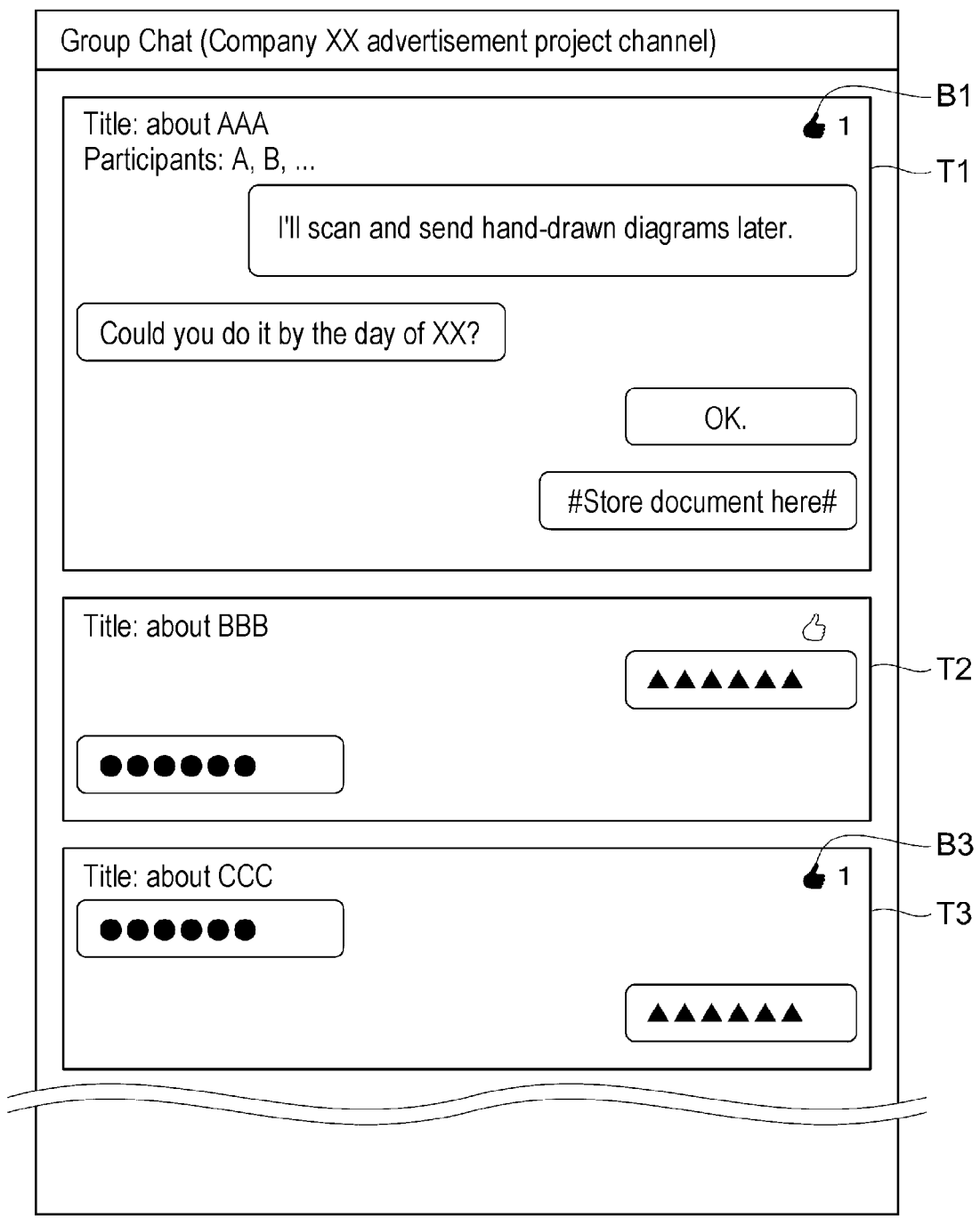
FIG. 11 illustrates a specific example in which a "Like" button is used to perform an operation for specifying a thread as an object to be output, on a group chat screen displayed on a display of a client terminal.

FIG. 11 illustrates a specific example in which a "Like" button is used to perform an operation for specifying a thread as an object to be output, on a group chat screen displayed on the display of a client terminal 50.

In FIG. 11, as an example of the group chat screen, a channel (name "Company XX advertisement project channel") including threads T1 through T3 is shown.

In the above-described specific examples shown in FIGS. 8 through 10, a digital document or message text is specified as an object to be output. A thread can also be specified as an object to be output, as shown in FIG. 11. It is assumed that the member M1 wishes to print out all the messages posted in the thread T1 and those in the thread T3. In this case, the member M1 presses buttons B1 and B3, which are "Like" buttons, respectively provided for the threads T1 and T3. By this operation, the user can specify all the messages posted in the thread T1 and the thread T3 as objects to be output (printed, for example).

The number "1" is indicated adjacent to each of the buttons B1 and B3. As in the above-described button B19, in addition to or instead of the original meaning of the number indicated near a "Like" button, this number indicates the number of members M having performed the operation for specifying a certain object to be output. For example, as shown in FIG. 11, the number of members M having performed the operation for specifying all the messages posted in the thread T1 and that for specifying all the message posted in the thread T3 as an object to be output are found to be one from the number "1" indicated adjacent to each of the buttons B1 and B3.

Figure 12:
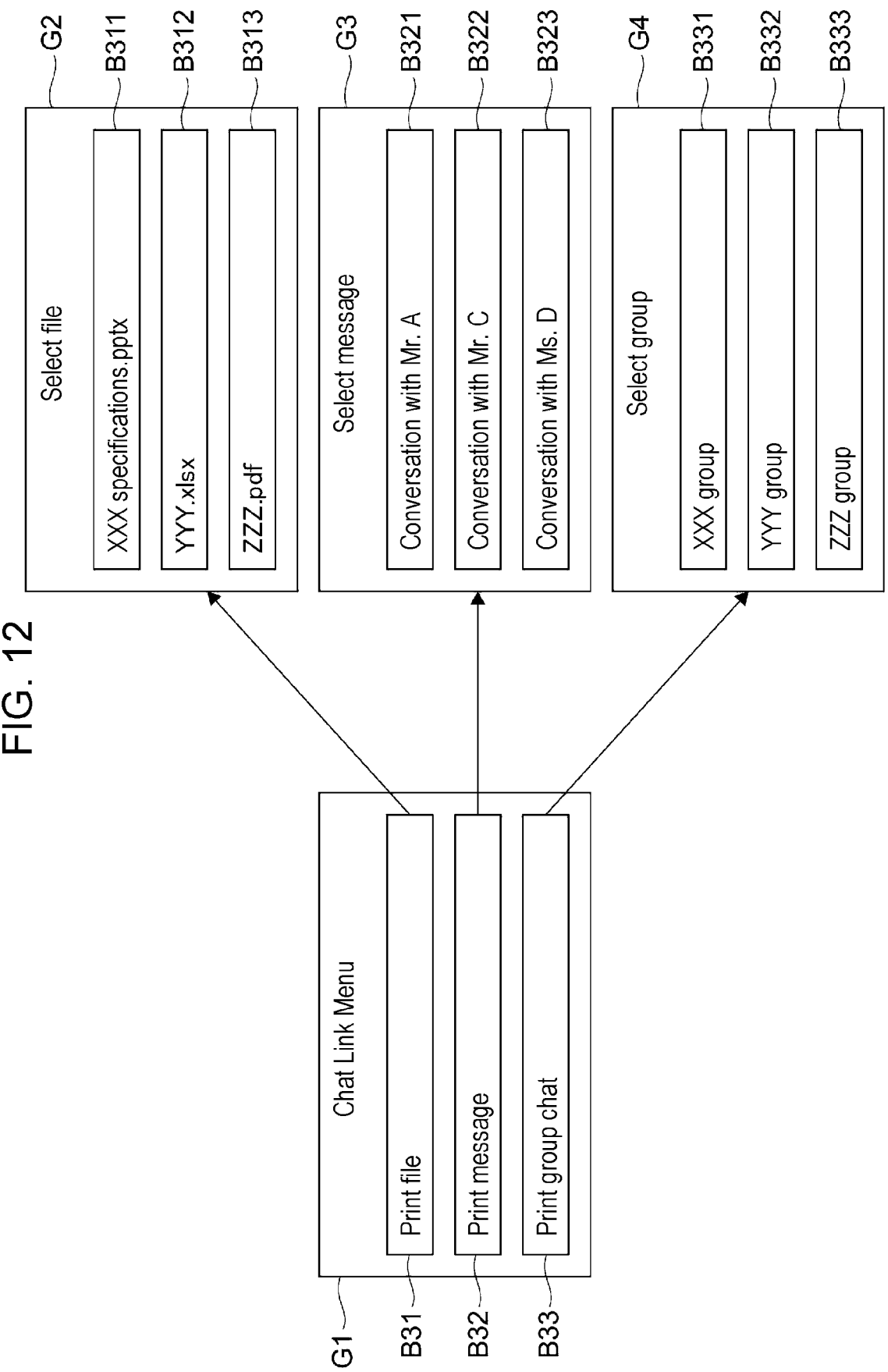
FIG. 12 illustrates specific examples of screens displayed on a display of the image forming device.
Figure 13A:
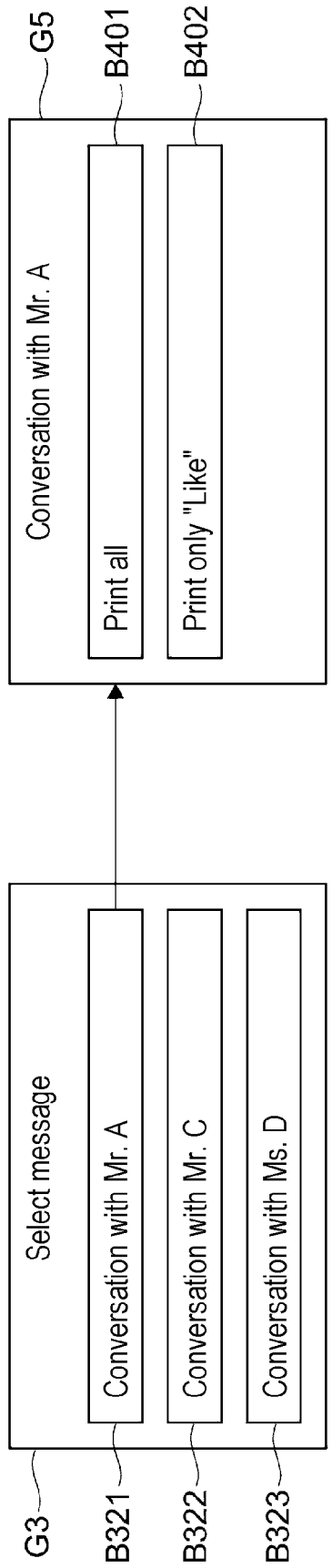
FIGS. 13A and 13B illustrate specific examples of screens displayed on the display of the image forming device.
Figure 13B:
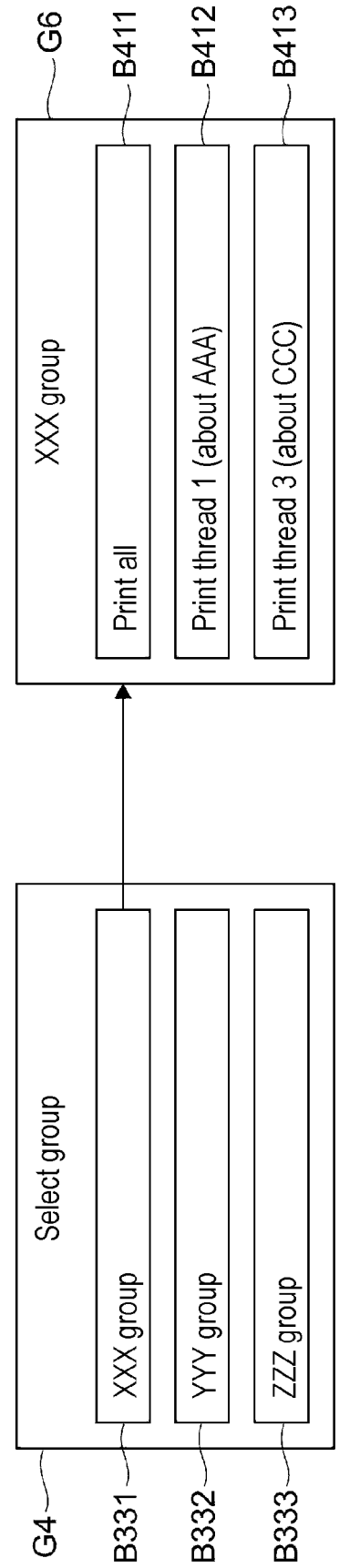

FIGS. 12 through 13B illustrate specific examples of the screens displayed on the display 36 of the image forming device 30.

As discussed with reference to FIGS. 8 through 11, the operation for specifying an object to be output can be performed on the group chat screen displayed on the display of the client terminal 50. Alternatively, this operation can be performed on the screen displayed on the display 36 of the image forming device 30.

As stated above, the image forming device 30 obtains thread information provided by the group chat providing server 70. To enable a group member to specify an object to be output, the image forming device 30 extracts, from the obtained thread information, information for identifying a thread, message text posted on a thread, and a digital document attached to a message posted on a thread and display them on the screen in a selectable format.

FIG. 12 illustrates screens G1 through G4 as examples of the screens displayed on the display 36 of the image forming device 30. The screen G1 with a title "Chat Link Menu" serves as the top screen to be displayed for a member to perform an operation for specifying an object to be output by using the image forming device 30. For example, if the member M1 wishes to print out a digital document posted on a thread by operating the image forming device 30, it first logs in application software for linking the image forming device 30 with the group chat, and then, the screen G1 is displayed as the top screen.

On the screen G1, a "Print file" button B31, a "Print message" button B32, and a "Print group chat" button B33 are displayed. The member M1 intends to print out a digital document posted on a thread and thus presses the "Print file" button B31. Then, the screen G1 shifts to the screen G2 with a title "Select file".

On the screen G2, a list of digital documents posted on threads of the group chat that the member M1 is authorized to read is displayed in a selectable format. In the example in FIG. 12, buttons B311 through B313 each with the file name of a digital document are displayed. The member M1 presses the button with the file name of the digital document that the member M1 intends to print out, thereby specifying the digital document to be printed out.

If the member M1 wishes to extract, among the messages posted on a thread, messages exchanged with a specific member M and to print them out, the member M1 presses the "Print message" button B32 on the screen G1. Then, the screen G1 shifts to the screen G3 with a title "Select message".

On the screen G3, a list of information indicating the conversation (exchanged messages) between the member M1 and each of the members M2 through Mn belonging to the group G is displayed in a selectable format. In the example in FIG. 12, buttons B321 through B323, each used for selecting the conversation between the member M1 and the corresponding one of the three members M (Mr. A, Mr. C, and Ms. D) are displayed. The member M1 presses one of the buttons B321 through B323 for selecting the content of conversation to be printed, thereby specifying text of messages to be printed out.

If the member M1 wishes to print out the messages with Mr. A, it presses the "Conversation with Mr. A" button B321. Then, the screen G3 shifts to a screen G5 with a title "Conversation with Mr. A", as shown in FIG. 13A.

On the screen G5, a "Print all" button B401 and a "Print only "Like" " button B402 are displayed. If the member M1 wishes to print out all the messages exchanged with Mr. A, it presses the "Print all" button B401. In contrast, if the member M1 has pressed a "Like" button provided for a message to individually specify a message, it can print out by pressing the "Print only "Like" " button B402, among all the messages with Mr. A, a message with Mr. A for which a "Like" button is pressed. The member M1 may specify the time and the date to restrict messages to be printed out to those posted at the specified time and date onwards, though such an example is not illustrated. Once a specified object is printed out, a "Like" button may be automatically canceled, or the member M1 may select whether to cancel the "Like" button.

If the member M1 wishes to print out the content of a group chat, it presses the "Print group chat" button B33 on the screen G1. Then, the screen G1 shifts to the screen G4 with a title "Select group". On the screen G4, a list of information indicating at least one group to which the member M1 belongs is displayed in a selectable format. For example, in the example in FIG. 12, buttons B331 through B333 for three groups G (XXX group, YYY group, and ZZZ group) are displayed. The member M1 presses one of the buttons B331 through B333 indicating the group G to be selected, thereby specifying messages to be printed out as a group unit.

If the member M1 wishes to print out messages exchanged in the group chat of the XXX group, it presses the "XXX group" button B331 displayed on the screen G4. Then, the screen G4 shifts to a screen G6 with a title "XXX group", as shown in FIG. 13B.

On the screen G6, a "Print all" button B411, a "Print thread 1 (about AAA)" button B412, and "Print thread 3 (about CCC)" button B413 are displayed. If the member M1 wishes to print out all the messages exchanged in the group chat of the XXX group, it presses the "Print all" button B411.

In contrast, if the member M1 has pressed a "Like" button provided for a thread in the group chat to individually specify a thread, a button for selecting a thread for which a "Like" button is pressed is displayed on the screen G6. For example, the "Print thread 1 (about AAA)" button B412 indicates that, as a result of the member M1 having pressed a "Like" button (the button B1 for the thread T1 shown in FIG. 11, for example), the thread 1 with the title "about AAA" has been specified as an object to be output. The "Print thread 3 (about CCC)" button B413 indicates that, as a result of the member M1 having pressed a "Like" button (the button B3 for the thread T3 shown in FIG. 11, for example), the thread 3 with the title "about CCC" has been specified as an object to be output.

If the member M1 intends to print out all the messages posted on the thread 1 with the title "about AAA", it presses the "Print thread 1 (about AAA)" button B412. If the member M1 intends to print out all the messages posted on the thread 3 with the title "about CCC", it presses the "Print thread 3 (about CCC)" button B413.

Figure 14:
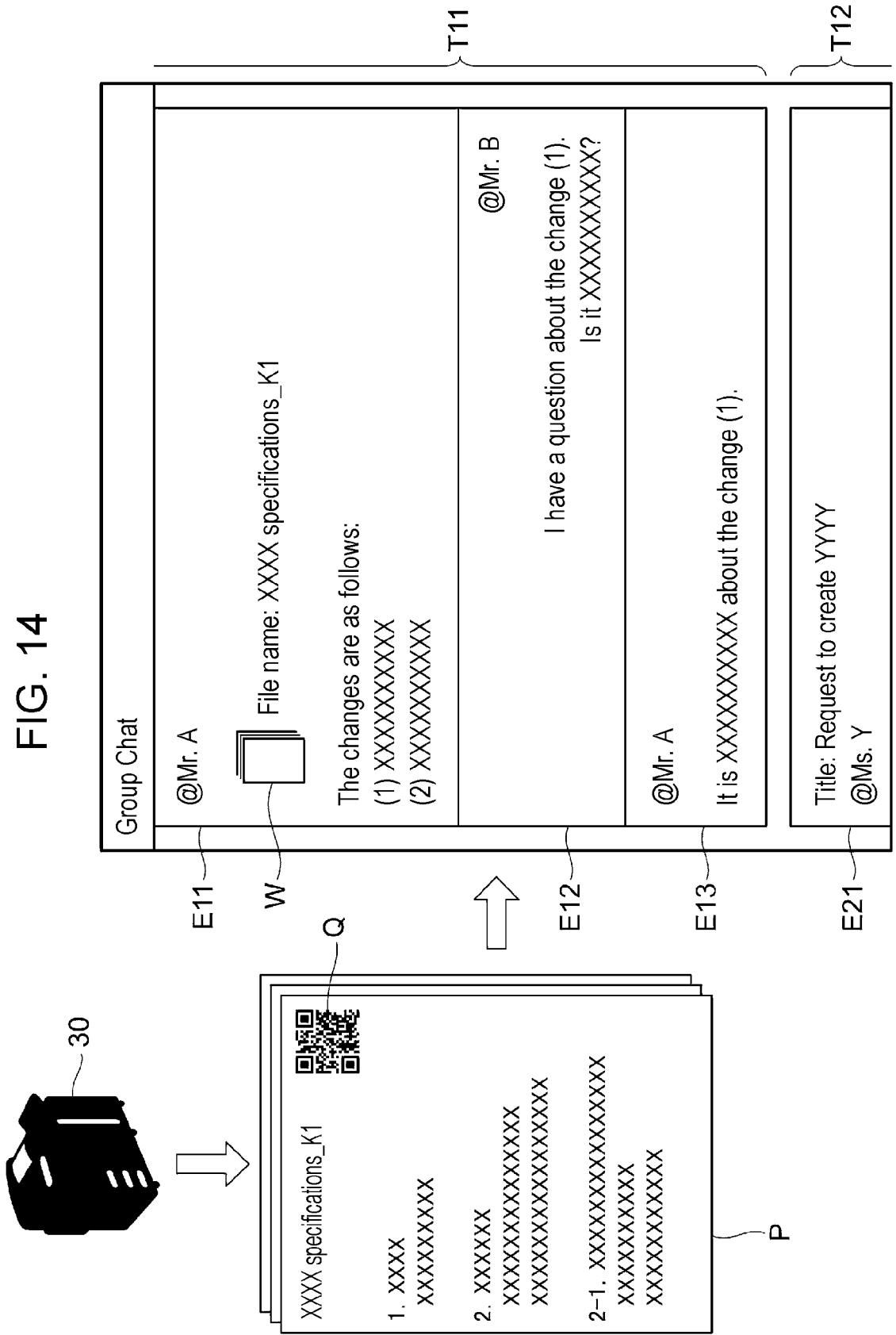
FIG. 14 illustrates a specific example of a document output from the image forming device and that of a group chat screen including a thread on which this document is posted as a digital document.

FIG. 14 illustrates a specific example of a document output from the image forming device 30 and that of a group chat screen including a thread on which this document is posted as a digital document.

When a digital document is specified as an object to be printed, the image forming device 30 forms image data indicating the content of the specified digital document on the print surface of a recording medium, such as a sheet, and outputs the document as a paper medium document. On the print surface of the same sheet, the image forming device 30 also forms and outputs a two-dimensional code linked with the URL of the thread of the group chat on which this digital document is posted. In FIG. 14, a paper medium document P printed and output from the image forming device 30 and a group chat screen including a thread T11 on which a digital document W, which is the digital form of the paper medium document P, is posted are shown.

On the paper medium document P printed and output from the image forming device 30, the content of the digital document W with a file name "XXXX specifications_K1", which is specified as an object to be printed, and a two-dimensional code Q linked with the URL of the thread T11 on which the digital document W is posted are formed.

For example, when the member M1 reads the two-dimensional code Q formed on the paper medium document P by operating the client terminal 50-1, the client terminal 50-1 accesses the URL of the thread T11 linked with the two-dimensional code Q. Then, the group chat screen shown in FIG. 14 is displayed on the display of the client terminal 50-1.

When the content of the thread T11 is displayed on the display of the client terminal 50-1, the messages posted on the thread T11 may be displayed in chronological order of posting or be displayed in the order of each member M having posted messages. Alternatively, as in the example in FIG. 14, a message E11 appended with the digital document W may be displayed at the head. The member M may be able to set the display order of messages as desired by input operation.

Figure 15:
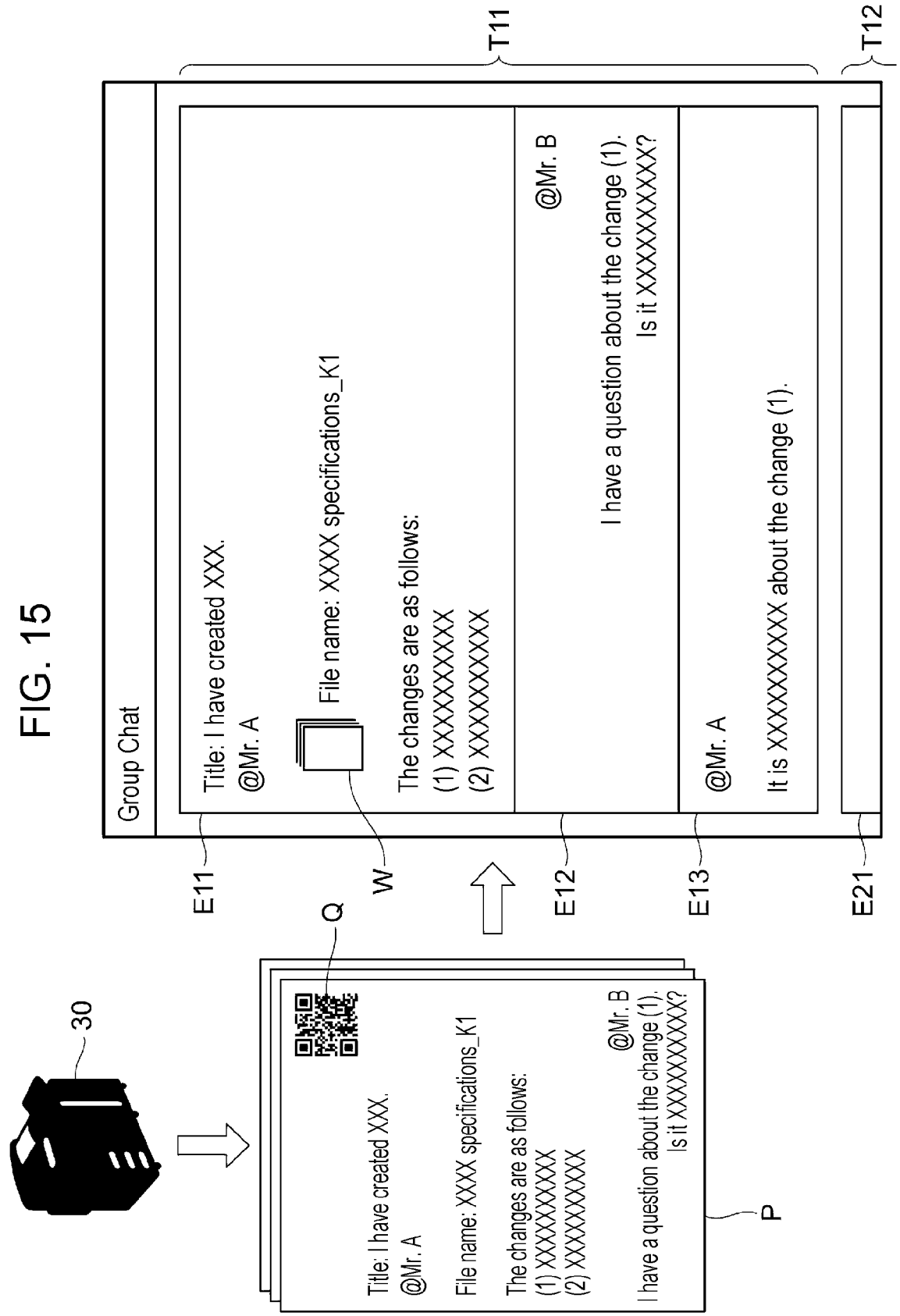
FIG. 15 illustrates a specific example of a document of a thread output from the image forming device and that of a group chat screen including this thread.

FIG. 15 illustrates a specific example of a document of a thread output from the image forming device 30 and that of a group chat screen including this thread.

When a thread is specified as an object to be printed, the image forming device 30 forms data indicating the content of the thread and a two-dimensional code linked with the URL of the thread on the print surface of a recording medium, such as a sheet. In FIG. 15, a paper medium document P printed and output from the image forming device 30 and a group chat screen including a thread T11 specified as an object to be output are shown.

On the paper medium document P printed and output from the image forming device 30, all the messages posted on the thread T11, which is specified as an object to be printed, and a two-dimensional code Q linked with the URL of the thread T11 are formed.

For example, when the member M1 reads the two-dimensional code Q formed on the paper medium document P by operating the client terminal 50-1, the client terminal 50-1 accesses the URL of the thread T11 linked with the two-dimensional code Q. Then, the group chat screen shown in FIG. 15 is displayed on the display of the client terminal 50-1.

When the content of the thread T11 is displayed on the display of the client terminal 50-1, the messages posted on the thread T11 may be displayed in chronological order of posting. Alternatively, a message appended with a digital document may be preferentially displayed on a higher position. For example, as in the example in FIG. 15, a message E11 appended with the digital document W may be displayed at the head. The member M may be able to set the display order of messages as desired by input operation.

In both of the examples in FIGS. 14 and 15, as the content of the thread T11 displayed on the display of the client terminal 50-1, the latest content at the time point when the content is displayed or that when the identification image of the thread T11 is generated may be used. The member M may be able to set which content of a specified object is to be displayed by input operation.

In both of the examples in FIGS. 14 and 15, when the client terminal 50-1 accesses the group chat to display the thread T11, authentication processing is performed to determine whether the member M1 is authorized to access the thread T11. If the member M1 is not authorized to access the thread T11, the content of the thread T11 is not displayed on the display of the client terminal 50-1.

Although the exemplary embodiment has been discussed above, the disclosure is not restricted thereto. The system configuration shown in FIG. 1, the hardware configurations shown in FIGS. 2 and 3, and the functional configurations shown in FIGS. 4 and 5 are only examples and are not limited to those shown in the drawings. The information processing system 1 shown in FIG. 1 may only include functions that can implement the above-described processing as a whole. The functional configurations for implementing such functions are not limited to those shown in FIGS. 4 and 5.

The orders of steps shown in FIGS. 6 and 7 are only examples and are not limited to those in FIGS. 6 and 7. The operations in steps shown in FIGS. 6 and 7 may not necessarily be executed in chronological order and may be executed in parallel or individually. The screens shown in FIGS. 8 through 15 are only examples of a message exchange service screen or an application software screen for linking the image forming device 30 with a group chat. Various user interfaces for implementing a message exchange service screen or an application software screen for linking the image forming device 30 with a group chat can be utilized.

In the above-described exemplary embodiment, an identification image is output by printing in the image forming device 30. However, an identification image may be output by an approach other than printing. For example, an identification image generated in the management server 10 may be displayed on the client terminal 50. In this case, the member M may display a two-dimensional code as an identification image on the display of the client terminal 50 and cause the image forming device 30 to read the two-dimensional code, thereby printing out an object to be output with the two-dimensional code.

In the above-described exemplary embodiment, an identification image is generated in the management server 10. However, an identification image may be generated in the image forming device 30 since it is used and printed in the image forming device 30.

In the above-described exemplary embodiment, a two-dimensional code, such as a QR code (registered trademark), is used as an identification image. However, any type of image that enables a user to access a thread by reading the image may be used as an identification image.

In the above-described exemplary embodiment, a URL is used as access information linked with an identification image. However, any type of information that enables a user to access a thread by reading an identification image may be used as access information.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
generate an identification image in response to at least one of a thread of messages sent in a chat service and a digital document posted on the thread being specified, the thread being displayed on a service screen of a message exchange service, the identification image that can be read to access the thread; and
perform control to output the generated identification image in a readable format.

2. The information processing apparatus according to claim 1, wherein the processor is configured to, if performing control to output the generated identification image, perform control to provide the identification image to a different information processing apparatus and to cause the different information processing apparatus to output the identification image in a readable format.

3. The information processing apparatus according to claim 2, wherein the processor is configured to, if performing control to output the generated identification image, perform control to cause the different information processing apparatus to display the identification image on a screen of the different information processing apparatus.

4. The information processing apparatus according to claim 1, wherein the processor is configured to:
generate the identification image linked with information for accessing the thread, in response to at least one of the thread and the digital document being specified as an object to be printed; and
if performing control to output the generated identification image in a readable format, perform control to form the identification image on a print surface of a recording medium used for printing the object to be printed.

5. The information processing apparatus according to claim 4, wherein the processor is configured to, in response to an input operation performed for inputting into an input field so as to specify the object to be printed, the input field being provided for each thread displayed on the service screen of the message exchange service, generate the identification image linked with information for accessing a thread for which the input operation is performed.

6. The information processing apparatus according to claim 5, wherein the processor is configured to, if the digital document is posted on the thread for which the input operation is performed, generate the identification image linked with information for accessing the thread, the thread including text of a message on which the digital document is posted, the text of the message being displayed at a head of the thread.

7. The information processing apparatus according to claim 4, wherein the processor is configured to, in response to text of a message included in the thread being also specified as the object to be printed, generate the identification image linked with information for accessing the thread, the specified text of the message being displayed at a head of the thread.

8. The information processing apparatus according to claim 7, wherein the processor is configured to, in response to an input operation performed for inputting into an input field so as to specify the object to be printed, the input field being provided for text of each message included in the thread, generate the identification image linked with information for accessing the thread including the text of a message for which the input operation is performed, the text of the message being displayed at a head of the thread.

9. The information processing apparatus according to claim 8, wherein the processor is configured to, if the input operation is performed for text of each of a plurality of messages included in the thread so as to specify the object to be printed, generate the identification image linked with information for accessing the thread including the text of each of the plurality of messages for which the input operation is performed, the plurality of messages in the thread being displayed by using at least one of first and second approaches, the first approach being an approach in which the plurality of messages are displayed in a chronological order of posting, the second approach being an approach in which the plurality of messages are displayed in an order of each user having posted the plurality of messages.

10. The information processing apparatus according to claim 4, wherein the processor is configured to, in response to text of a message on which the digital document is posted being specified as the object to be printed, generate the identification image linked with information for accessing a screen, the specified text of the message being displayed at a head of the thread including the specified text of the message on the screen.

11. The information processing apparatus according to claim 10, wherein the object to be printed is specified by performing an input operation as a reply to the text of the message.

12. The information processing apparatus according to claim 11, wherein, if the input operation is performed, information concerning a condition for printing the object is input.

13. An information processing system comprising:
- a generator configured to generate an identification image in response to at least one of a thread of messages sent in a chat service and a digital document posted on the thread being specified, the thread being displayed on a service screen of a message exchange service, the identification image being linked with information for accessing the thread; and
- an output controller that performs control to output the generated identification image in a readable format.

14. A non-transitory computer readable medium storing a program, which if executed, causes a computer to execute a process, the process comprising:
- generating an identification image in response to at least one of a thread of messages sent in a chat service and a digital document posted on the thread being specified, the thread being displayed on a service screen of a message exchange service, the identification image being linked with information for accessing the thread; and
- performing control to output the generated identification image in a readable format.

* * * * *